(12) United States Patent
Ushio et al.

(10) Patent No.: US 11,921,403 B2
(45) Date of Patent: Mar. 5, 2024

(54) ELECTRONIC DEVICE

(71) Applicant: NIDEC COPAL CORPORATION, Tokyo (JP)

(72) Inventors: Ryosuke Ushio, Tokyo (JP); Koji Sawanobori, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 17/865,394

(22) Filed: Jul. 15, 2022

(65) Prior Publication Data

US 2023/0026738 A1 Jan. 26, 2023

(30) Foreign Application Priority Data

Jul. 21, 2021 (JP) ................................ 2021-120419

(51) Int. Cl.
*G03B 11/04* (2021.01)
*G06F 1/16* (2006.01)
*H04N 23/51* (2023.01)

(52) U.S. Cl.
CPC .......... *G03B 11/043* (2013.01); *G06F 1/1686* (2013.01); *H04N 23/51* (2023.01)

(58) Field of Classification Search
CPC ...... G03B 11/043; H04N 23/51; G06F 1/1686
See application file for complete search history.

(56) References Cited

U.S. PATENT DOCUMENTS

| | | | |
|---|---|---|---|
| 2020/0249415 A1 | 8/2020 | Wang et al. | |
| 2021/0112199 A1* | 4/2021 | Song | H04N 23/80 |
| 2021/0349374 A1* | 11/2021 | Hung | G06F 1/1686 |
| 2021/0365671 A1* | 11/2021 | Jiang | G06F 1/1686 |

* cited by examiner

*Primary Examiner* — Minh Q Phan
(74) *Attorney, Agent, or Firm* — HAUPTMAN HAM, LLP

(57) ABSTRACT

An electronic device allows the user to notice that no image capturing is being performed and increases the user comfort as well as includes a small open-close device incorporated in a limited space. A camera module is covered by a blade. This allows the user to notice that no image capturing is being performed and increases the user comfort. A base is attached to a first surface of a module board, and a cover has a first end in the longitudinal direction attached to the base and a second end in the longitudinal direction supported by the first surface of the module board. The base may not extend to the second end of the cover in the longitudinal direction and can have a shorter length (miniaturized), further miniaturizing a blade open-close device.

7 Claims, 15 Drawing Sheets

FIG. 3 [Cross section along line A-A]

[ Closing operation ]

[ Opening operation ]

[ Closed ]

ELECTRONIC DEVICE

RELATED APPLICATIONS

The present application claims priority to Japanese Application Number 2021-120419, filed Jul. 21, 2021, the disclosure of which is hereby incorporated by reference herein in its entirety.

BACKGROUND

Technical Field

The present invention relates to an electronic device including a detection device or a light-emitting device.

Description of the Background

Electronic devices such as laptop personal computers and smartphones incorporate camera units. Such an electronic device incorporating a camera unit usually has an opening facing a lens of the camera unit in its frame. Typically, such an opening is constantly uncovered and ready for image capturing. Without appropriate management for, for example, computer virus protection by a user, this camera unit may be controlled and operated by a malicious third party. This can cause, for example, personal information to be released onto a network through the camera unit.

In response to the above issue, for example, Patent Literature 1 describes an open-close device (shutter device) usable in an electronic device incorporating a camera unit. The open-close device described in Patent Literature 1 physically covers a lens included in the camera unit with a shutter. This allows rightful users of the electronic device to visually determine whether the lens is covered by the open-close device, allowing the user to notice the nonoperational state of the camera unit and thus increasing the user comfort.

CITATION LIST

Patent Literature

Patent Literature 1: U.S. Patent Application Publication No. 2020/0249415

BRIEF SUMMARY

Some electronic devices include light-receiving sensors and light-emitting devices in addition to camera units. A user may have difficulty in noticing that a sensor other than the camera unit is a device that does not capture images of the user from its appearance alone. More specifically, the user may misunderstand such a sensor other than the camera unit as a camera unit. In this case, the user may worry that unintended images may be captured, although the camera unit is covered by an open-close device.

Electronic devices have been smaller with limited space for a camera unit including an open-close device. The open-close device described in Patent Literature 1 is limited by its size for such smaller electronic devices. More specifically, the open-close device described in Patent Literature 1 includes a base extending across the entire area in its longitudinal direction and a cap attached to the base. In particular, the base is a substantially rectangular prism with a large volume and is a large part of the open-close device. This has obstructed miniaturization of the entire open-close device.

One aspect of the present invention is directed to an electronic device that allows the user to notice that no image capturing is being performed and increases the user comfort.

Another aspect of the present invention is directed to an electronic device including a small open-close device incorporated in a limited space.

An electronic device according to an aspect of the present invention includes a frame being hollow, at least one of a detection device or a light-emitting device accommodated in the frame and facing an opening in the frame, and an open-close device accommodated in the frame. The open-close device covers and uncovers the opening. The open-close device includes a blade that covers and uncovers the opening, an actuator that reciprocates the blade, a base holding the actuator and attached to an attachment surface of the frame, and a cover covering the blade and having a first end in a longitudinal direction attached to the base and a second end in the longitudinal direction supported by the attachment surface.

The electronic device according to the above aspect of the present invention includes the blade for covering the detection device or the light-emitting device and allows the user to notice that no image capturing is being performed and increases the user comfort.

The base is attached to the attachment surface of the frame, and the cover has the first end in the longitudinal direction attached to the base and the second end in the longitudinal direction supported by the attachment surface of the frame. The base may not extend to the second end of the cover in the longitudinal direction and have a shorter length (miniaturized), further miniaturizing the open-close device. Thus, the frame included in an electronic device may be thinner, improving the functionality and the design of the electronic device.

DETAILED DESCRIPTION

A first embodiment of the present invention will now be described in detail with reference to the drawings.

Figure 1:
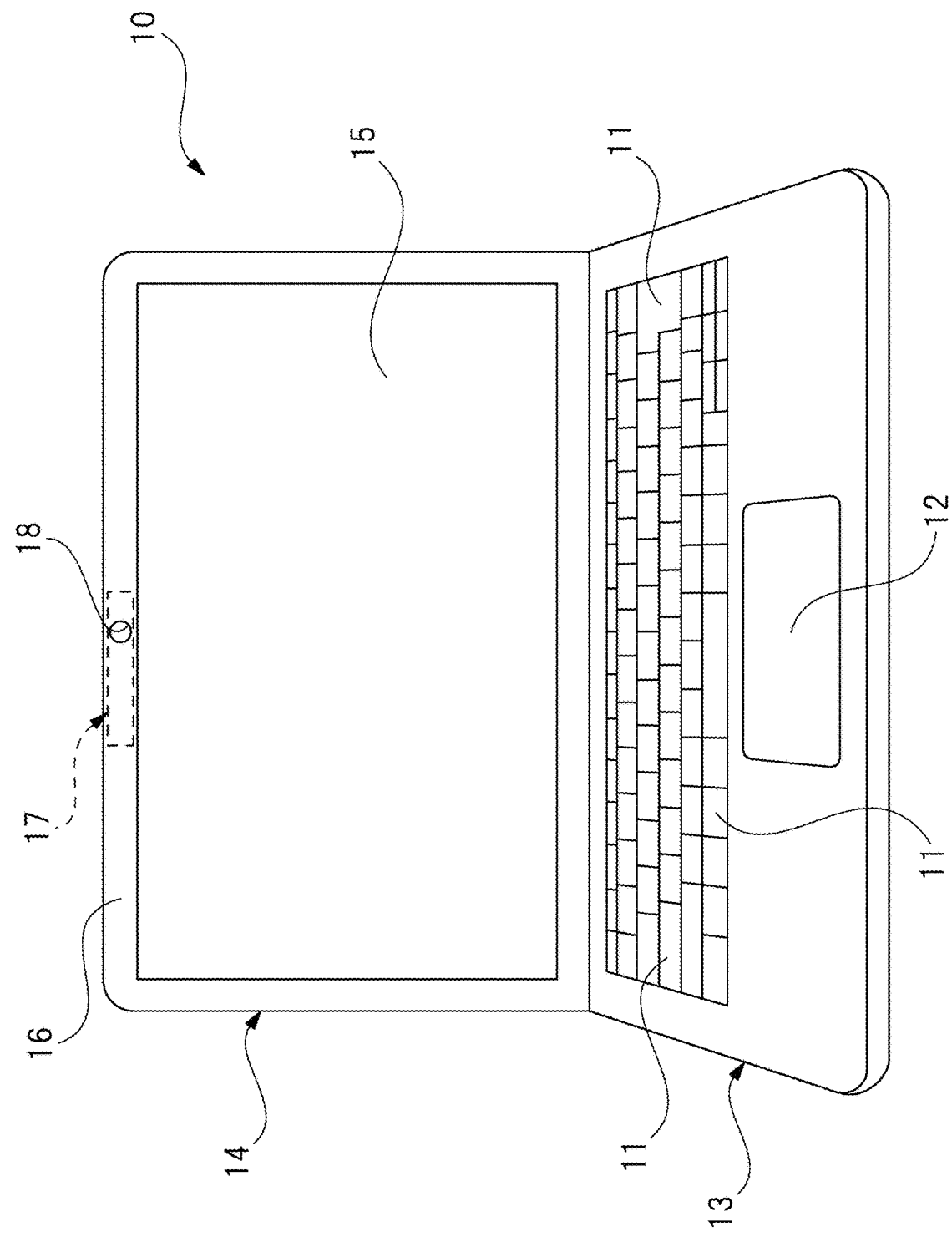
FIG. 1 is a schematic diagram of a laptop personal computer incorporating a camera unit.
Figure 2:
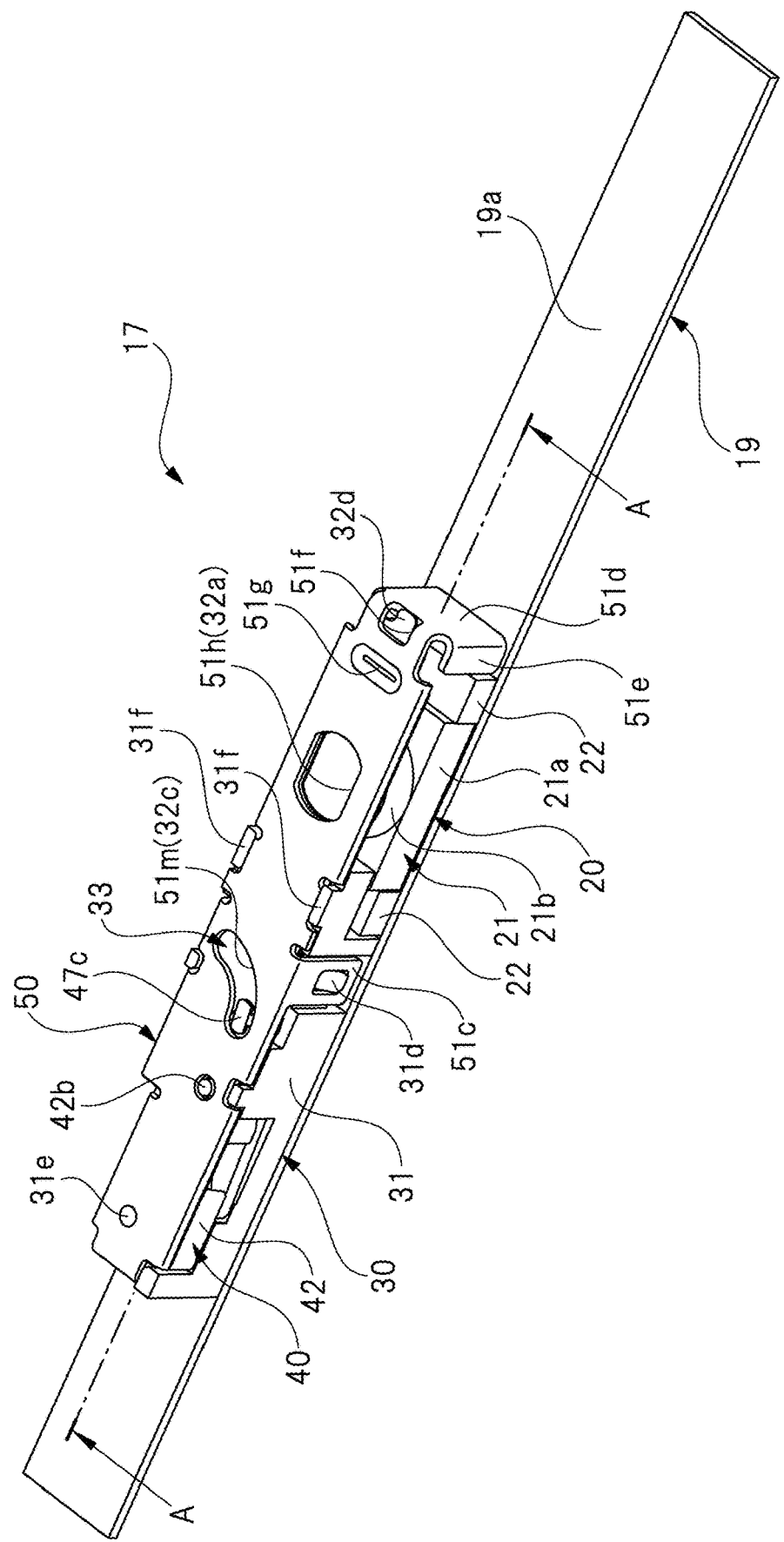
FIG. 2 is a perspective view of the camera unit in FIG. 1.
Figure 3:
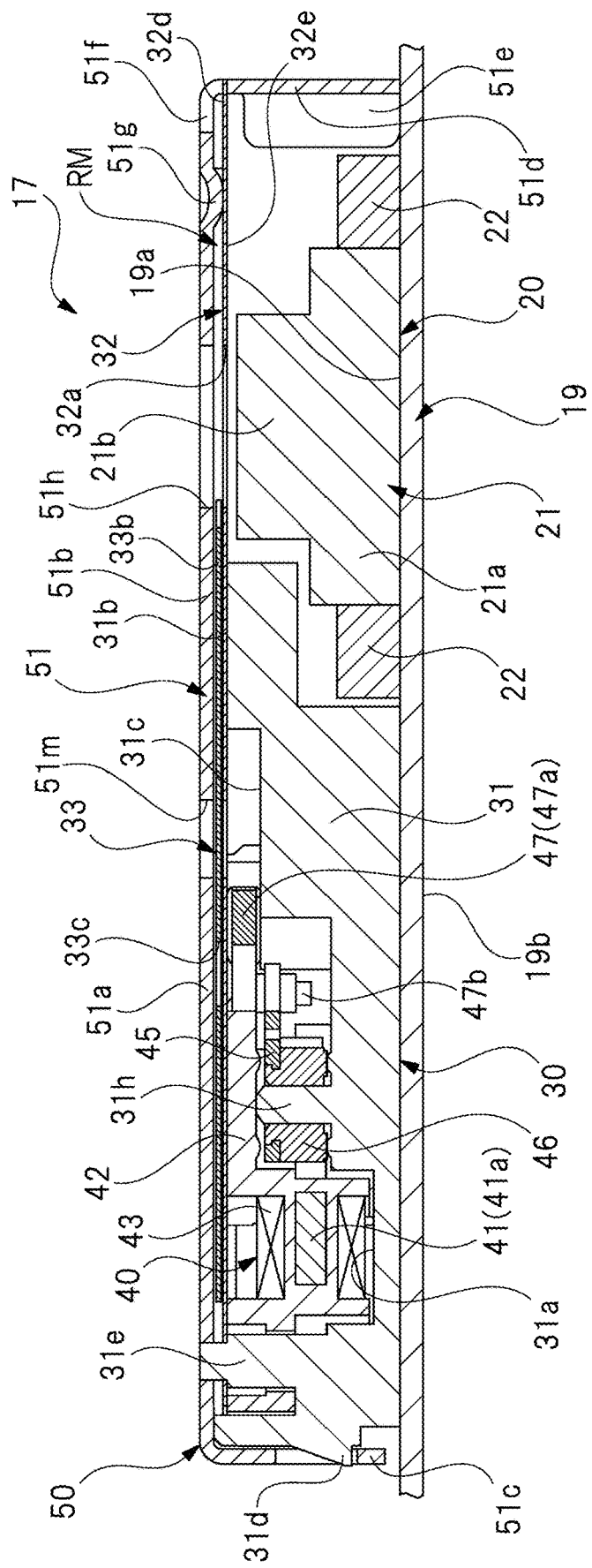
FIG. 3 is a sectional view taken along line A-A in FIG. 2.
Figure 4:
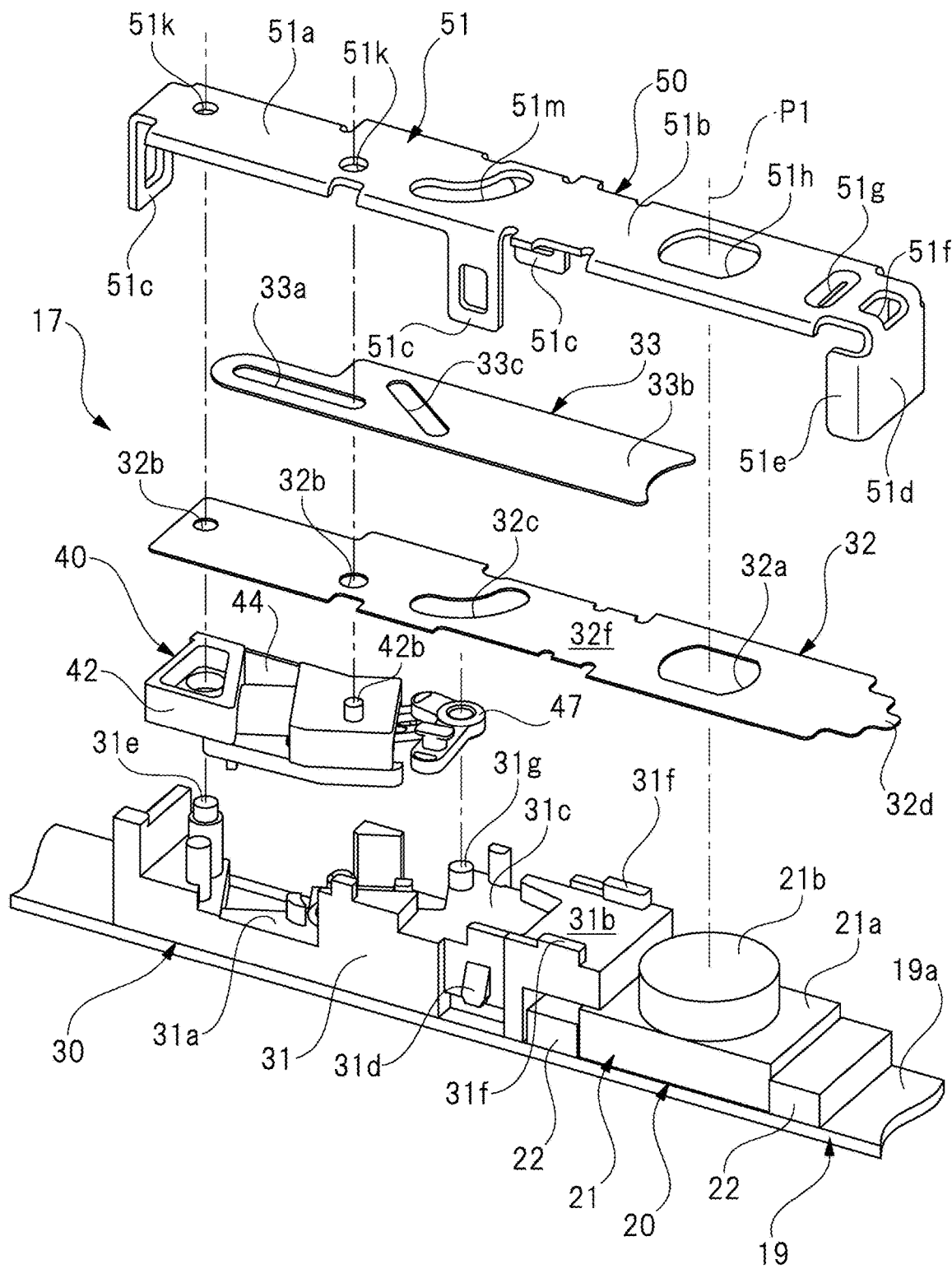
FIG. 4 is an exploded perspective view of the camera unit in FIG. 1.
Figure 5A:
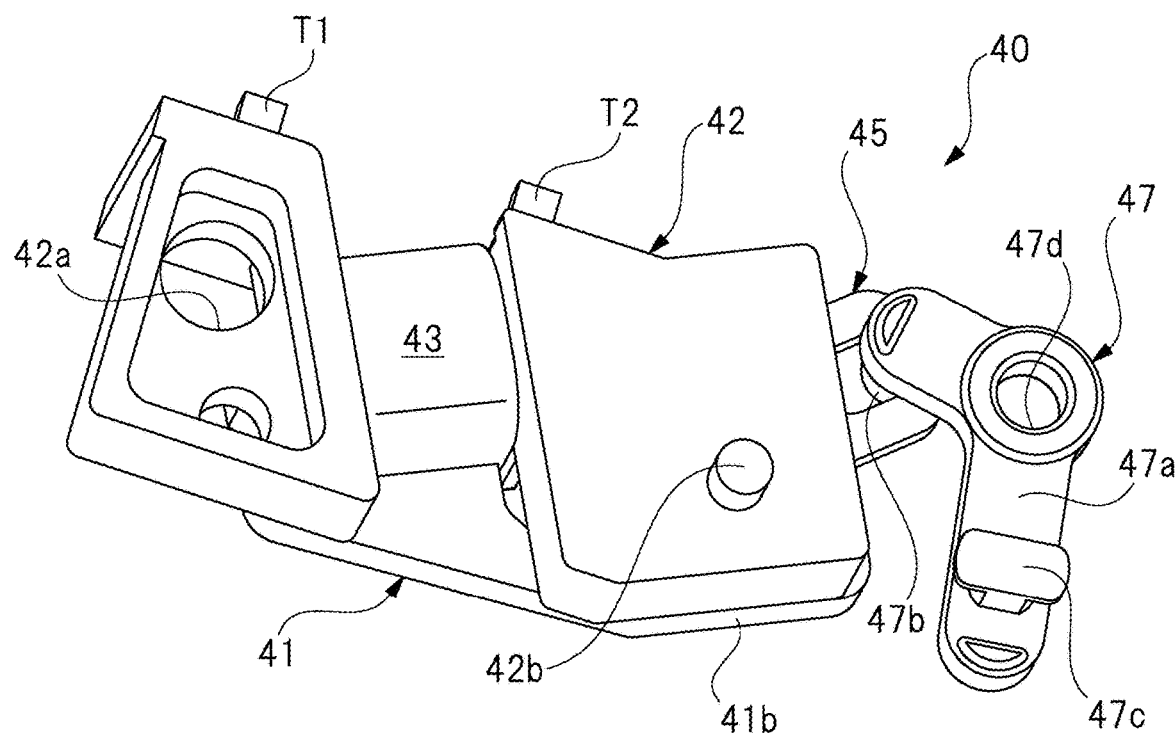
FIG. 5A is a perspective view of an actuator unit (front).
Figure 5B:
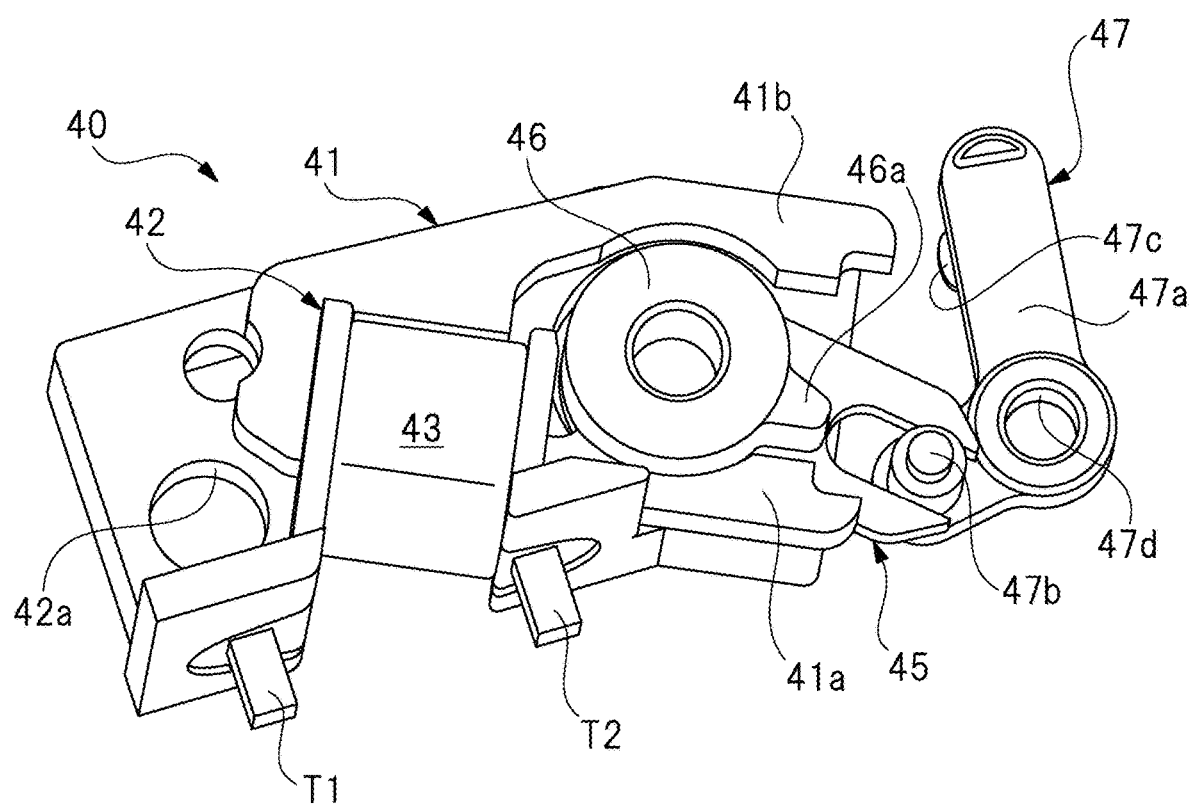
FIG. 5B is a perspective view of the actuator unit (back).
Figure 6A:
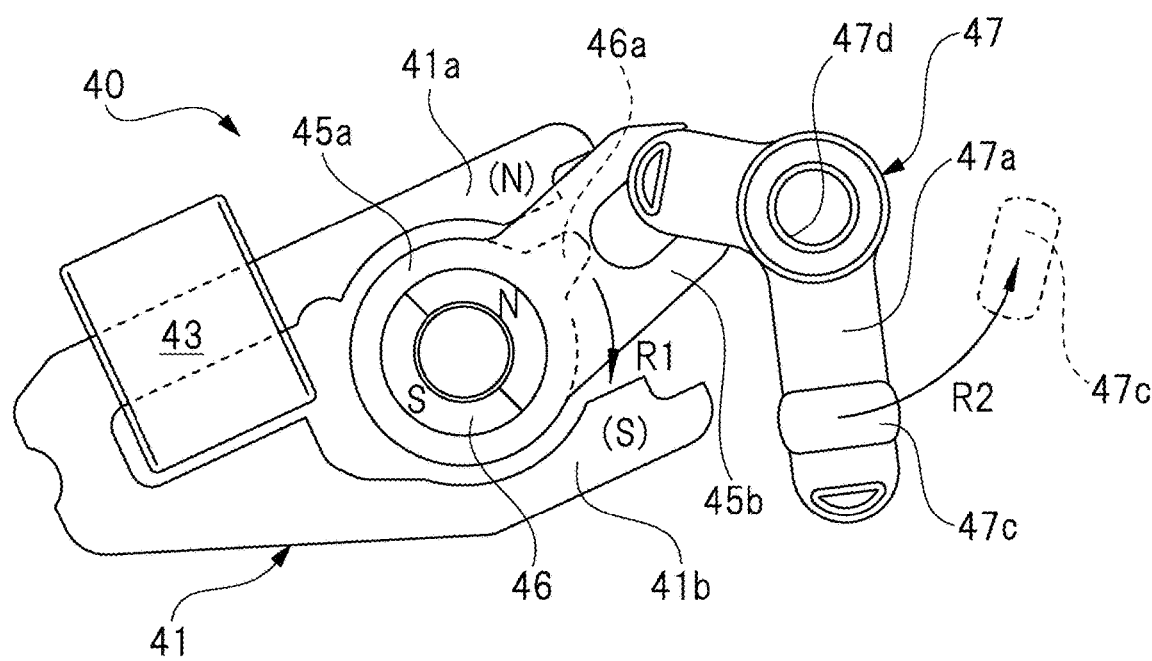
FIG. 6A is a diagram describing the operation of the actuator unit (closing).
Figure 6B:
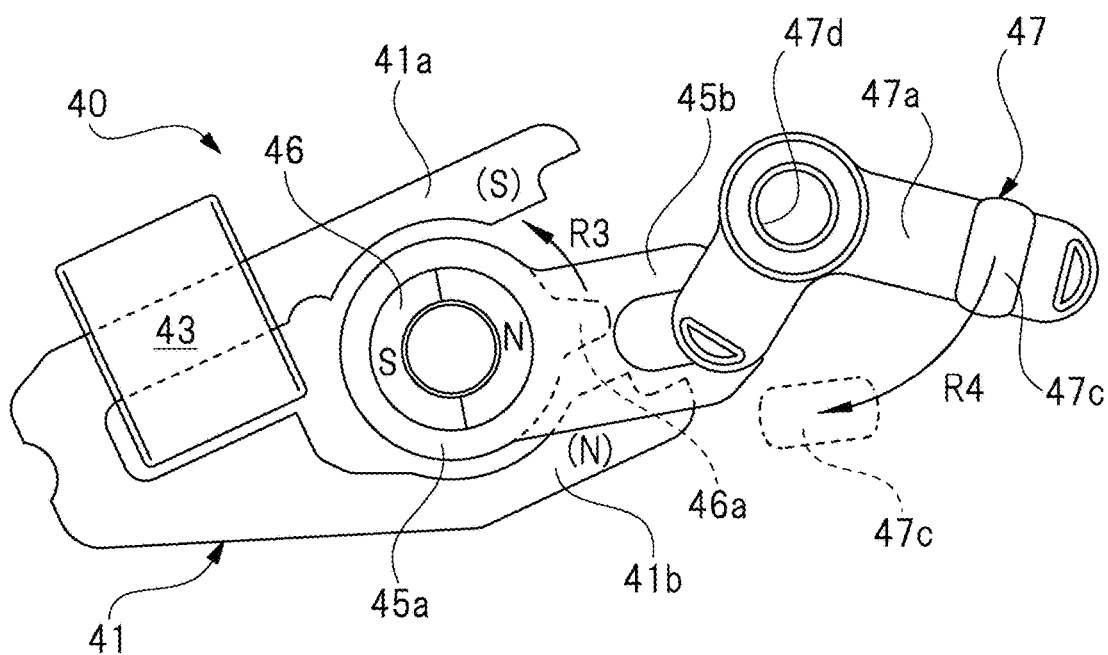
FIG. 6B is a diagram describing the operation of the actuator unit (opening).
Figure 7A:
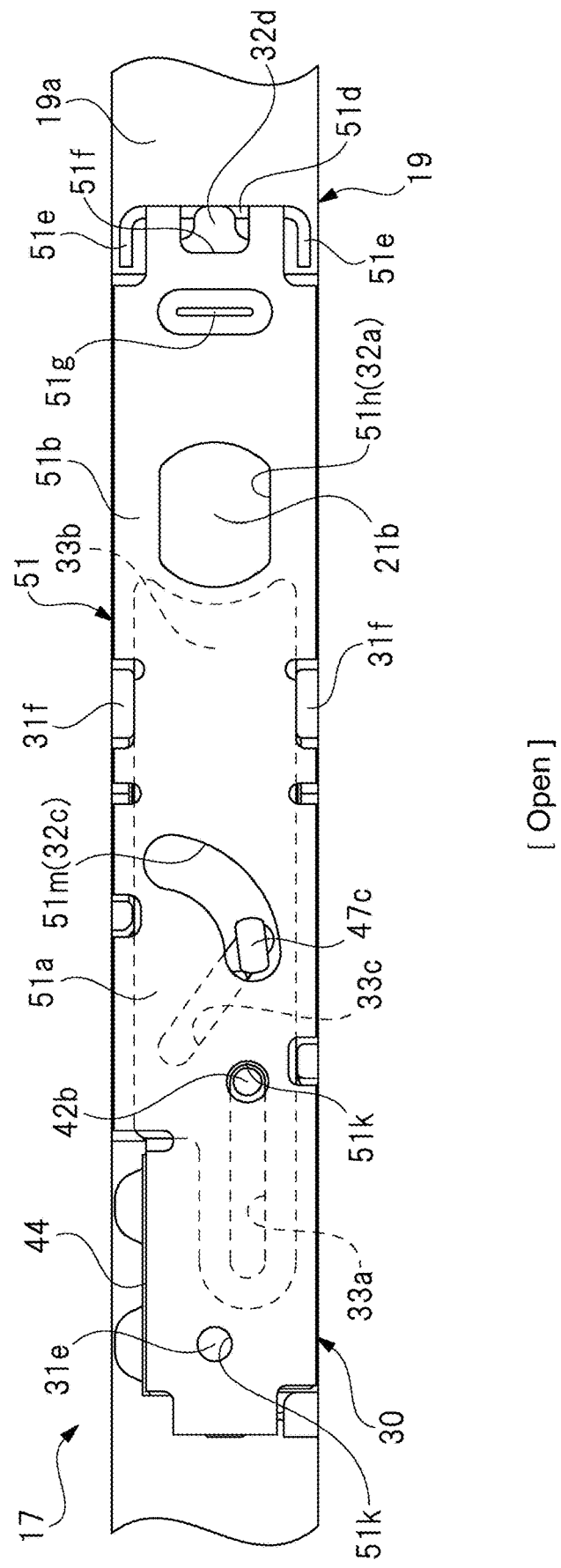
FIG. 7A is a diagram describing the operation of a blade (open).
Figure 7B:
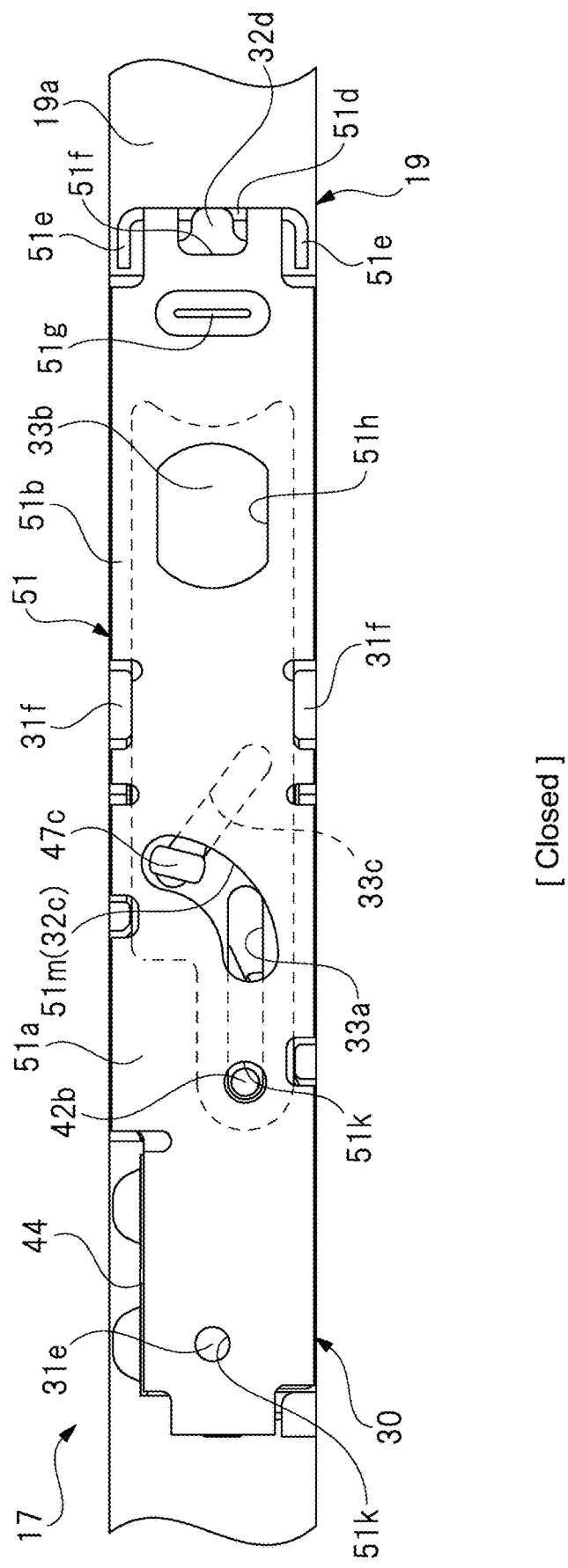
FIG. 7B is a diagram describing the operation of the blade (closed).

FIG. 1 is a schematic diagram of a laptop personal computer incorporating a camera unit. FIG. 2 is a perspective view of the camera unit in FIG. 1. FIG. 3 is a sectional view taken along line A-A in FIG. 2. FIG. 4 is an exploded perspective view of the camera unit in FIG. 1. FIG. 5A is a perspective view of an actuator unit (front). FIG. 5B is a perspective view of the actuator unit (back). FIG. 6A is a diagram describing the operation of the actuator unit (closing). FIG. 6B is a diagram describing the operation of the actuator unit (opening). FIG. 7A is a diagram describing the operation of a blade (open). FIG. 7B is a diagram describing the operation of the blade (closed).

As shown in FIG. 1, a laptop personal computer (electronic device) 10 includes a keyboard 13 and a display unit 14. The keyboard 13 includes multiple keys 11 and a touchpad 12 that are operable by a user. The display unit 14 displays operational information about the multiple keys 11 and the touchpad 12 as well as images, videos, and others on the Internet. The keyboard 13 and the display unit 14 are substantially flat plates. The keyboard 13 and the display unit 14 each are bent toward the other with hinges (not shown) to be open and closed.

The display unit 14 includes a display 15 that is, for example, a liquid crystal color monitor and a hollow frame 16 surrounding the display 15. The frame 16 supports the periphery of the display 15 to protect the display 15. The frame 16 accommodates a flexible substrate (not shown) for providing a driving current to the display 15 and a camera unit 17 usable for, for example, online meetings. The frame 16 has a small window (opening) 18 in a portion facing the camera unit 17. The small window 18 connects the inside and outside of the frame 16. The small window 18 faces a lens 21b (refer to FIGS. 2 and 3) in the camera unit 17. This allows the user to view the lens 21b through the small window 18.

As shown in FIGS. 2 to 4, the camera unit 17 accommodated in the frame 16 includes a module board 19, a camera module (detection device) 20, and a blade open-close device (open-close device) 30. The module board 19 is fixed inside the frame 16. The camera module 20 is attached to (mounted on) the module board 19. The blade open-close device 30 covers and uncovers the small window 18 (refer to FIG. 1) in the frame 16. The blade open-close device 30 is fixed to the module board 19, on which the camera module 20 is mounted, and is accommodated in the frame 16 in the laptop personal computer 10 as a component of the camera unit 17. This laptop personal computer 10 has a camera function.

The module board 19 is a printed circuit board (PCB). The module board 19 has a first surface (front surface) 19a and a second surface (back surface) 19b on both of which conductor wires are printed. The conductor wires are thin films formed from, for example, brass. The camera module 20 and the blade open-close device 30 are fixed to the first surface 19a of the module board 19. More specifically, the camera module 20 and the blade open-close device 30 are precisely and firmly fixed to the first surface 19a with, for example, an adhesive. The second surface 19b of the module board 19 is precisely and firmly fixed to the frame 16 with, for example, an adhesive. In this manner, the module board 19 is fixed to be integral with the frame 16. The first surface 19a of the module board 19 corresponds to an attachment surface in an aspect of the present invention.

The camera module 20 includes a lens unit 21. The lens unit 21 includes a base portion 21a fixed to the first surface 19a of the module board 19 and the substantially cylindrical lens 21b. The base portion 21a accommodates an image sensor (not shown). The lens 21b accommodates a convex lens (not shown). Recent highly functional electronic devices including the laptop personal computer 10 incorporate high-resolution image sensors. A higher-resolution image sensor is larger. The camera module 20 is thus to be larger. The camera unit 17 is to be miniaturized in the development of recent electronic devices.

Bonds 22 are located on both sides of the base portion 21a in the longitudinal direction of the module board 19 to fix the lens unit 21 to the module board 19. The bonds 22 are, for example, a resin adhesive.

As shown in FIGS. 2 to 4, the blade open-close device 30 includes a base 31 attached (fixed) to the first surface 19a of the module board 19, an actuator unit (actuator) 40 held by the base 31, a partition 32 located on the base 31, a cover 50 covering the base 31 and the camera module 20, and a blade 33 located between the cover 50 and the partition 32 in a movable manner. The blade 33 covers and uncovers the small window 18 in the frame 16.

The base 31 extends in the longitudinal direction of the module board 19. The base 31 and the camera module 20 are arranged side by side in the longitudinal direction of the module board 19. The base 31 is formed from a resin material such as plastic and is a substantially rectangular prism having multiple recesses and protrusions. The base 31 has an actuator-receiving recess 31a opposite to the camera module 20 in its longitudinal direction (first end in the longitudinal direction). The actuator-receiving recess 31a receives the actuator unit 40.

The base 31 includes a partition support 31b near the camera module 20 in the longitudinal direction (second end in the longitudinal direction). The partition support 31b receives the partition 32 and supports a central portion of the partition 32 in the longitudinal direction. The base 31 has a lever-receiving recess 31c between the actuator-receiving recess 31a and the partition support 31b in the longitudinal direction. The lever-receiving recess 31c receives a drive lever 47 in the actuator unit 40 in a swingable manner.

The actuator-receiving recess 31a, the partition support 31b, and the lever-receiving recess 31c have, in the thickness direction of the module board 19, depths that gradually increase in a stepwise manner in the order of the partition support 31b, the lever-receiving recess 31c, and the actuator-receiving recess 31a.

As shown in FIGS. 3 and 4, the base 31 integrally includes, on its periphery, three hook tabs 31d in total (two are shown in the figures) protruding outward from the base 31. The hook tabs 31d each have a substantially triangular cross section. Each hook tab 31d receives an engagement portion 51c included in the cover 50 being hooked. In other words, the hook tab 31d and the engagement portion 51c are snap-fitted. The cover 50 and the base 31 are engaged with each other at three points in total. The cover 50 is thus firmly fixed to the base 31 without rattling.

The actuator-receiving recess 31a is integral with a positioning protrusion 31e. The positioning protrusion 31e is received in an insertion hole 42a (refer to FIGS. 5A and 5B) in the actuator unit 40 to position the actuator unit 40 with respect to the actuator-receiving recess 31a. Thus, the actuator unit 40 is fixed in the actuator-receiving recess 31a without rattling. This allows a driving force of the actuator unit 40 to be efficiently transmitted to the blade 33.

The partition support 31b is integral with a pair of guide projections 31f projecting in the thickness direction of the module board 19. The guide projections 31f face each other in a width direction (lateral direction) intersecting with the longitudinal direction of the module board 19. The blade 33 is slidable between the pair of guide projections 31f while being guided by the guide projections 31f. This allows the blade 33 to move straight in the longitudinal direction without swinging in the lateral direction of the module board 19. This reduces a load applied to the actuator unit 40, thus reducing, for example, malfunctioning due to insufficient torque of the actuator unit 40.

The lever-receiving recess 31c is integral with a support pin 31g supporting the drive lever 47 in the actuator unit 40 in a swingable manner. This causes the drive lever 47 to be swingable about the support pin 31g in the lever-receiving recess 31c.

The actuator unit 40 is a drive source for reciprocating the blade 33 in the longitudinal direction of the module board 19. As shown in FIGS. 5A and 5B, the actuator unit 40 includes a substantially U-shaped metal (magnetic) yoke 41. The yoke 41 includes a first arm 41a and a second arm 41b. The first arm 41a is fixed to a coil bobbin 42 formed from a resin material (non-magnetic material) such as plastic. A coil (copper wire) 43 is wound around the first arm 41a with a predetermined number of turns with the coil bobbin 42 in between. The coil bobbin 42 includes a first connection terminal T1 and a second connection terminal T2 formed from a conductive material such as brass. The first connection terminal T1 and the second connection terminal T2 are, on one end, electrically connected to both ends of the coil 43 and are, on the other end, electrically connected to the module board 19 with a flexible substrate 44 (refer to FIGS. 4, 7A, and 7B).

This electrical connection allows switching of the direction of a driving current flowing through the coil 43 between a forward direction and a reverse direction, thus causing the first arm 41a, which is a magnetic body, to be magnetized to the N pole or the S pole. The second arm 41b, which is a magnetic body, is magnetized to the S pole when the first arm 41a is magnetized to the N pole, whereas the second arm 41b is magnetized to the N pole when the first arm 41a is magnetized to the S pole (refer to FIGS. 6A and 6B). This causes a magnet lever 45 included in the actuator unit 40 to swing in response to switching of the polarities of the first arm 41a and the second arm 41b.

The coil bobbin 42 has the insertion hole 42a for positioning the actuator unit 40 with respect to the actuator-receiving recess 31a (refer to FIGS. 3 and 4) of the base 31. More specifically, the insertion hole 42a receives the positioning protrusion 31e (refer to FIG. 4) on the base 31.

The magnet lever 45 included in the actuator unit 40 is supported by a swing shaft 31h (refer to FIG. 3), which is integral with the actuator-receiving recess 31a of the base 31, in a swingable manner. With the actuator unit 40 joined to the actuator-receiving recess 31a, the magnet lever 45 is located between the first arm 41a and the second arm 41b.

The magnet lever 45 is formed from a resin material such as plastic. As shown in FIGS. 6A and 6B, the magnet lever 45 includes an annular lever body 45a and a drive tab 45b having a fork-shaped distal end. The drive tab 45b receives an input protrusion 47b (refer to FIG. 5B) on the drive lever 47 in a split portion in the distal end. An annular rotor magnet 46 is fixed to the lever body 45a to be coaxial with the lever body 45a. More specifically, the rotor magnet 46 is located between the first arm 41a and the second arm 41b in a swingable manner. The rotor magnet 46 is a plastic magnet, which can be molded with high accuracy and is not fragile, thus being free of chipping.

As shown in FIGS. 5B, 6A, and 6B, the rotor magnet 46 integrally has a magnet projection 46a projecting radially outward from the rotor magnet 46. The rotor magnet 46 is magnetized to the N pole and the S pole at intervals of 180 degrees in its circumferential direction. The magnet projection 46a is magnetized to the N pole and projects toward the drive tab 45b. Thus, the magnet projection 46a is attracted to and repelled by the first arm 41a and the second arm 41b in response to switching of the polarities of the first arm 41a and the second arm 41b.

The first arm 41a and the second arm 41b are each magnetized to the N pole or the S pole in response to the direction of the driving current flowing through the coil 43 being switched between the forward direction and the reverse direction, generating an attractive force or a repulsive force. In contrast, the first arm 41a and the second arm 41b simply serve as metal bodies (magnetic bodies) when the coil 43 is not energized. Thus, for example, when a driving current is supplied to the coil 43 to cause the first arm 41a to attract the magnet projection 46a and then the supply of the driving current is stopped (or in other words, the coil 43 is not energized), this state (nonenergized state) is retained. This is because the first arm 41a as a magnetic body that has been demagnetized is attracted under the magnetic force from the magnet projection 46a. The coil 43 may temporarily receive the driving current, thus reducing power consumption.

As shown in FIGS. 5A and 5B, the actuator unit 40 includes the substantially L-shaped drive lever 47 formed from a resin material such as plastic. The drive lever 47 is located between the magnet lever 45 and the blade 33 driven by the drive lever 47. The drive lever 47 converts swinging motion of the magnet lever 45 into linear motion of the blade 33. The drive lever 47 includes a substantially L-shaped lever body 47a. The lever body 47a has a first end in its longitudinal direction including the input protrusion 47b received in the split portion in the distal end of the drive tab 45b. The lever body 47a has a second end in the longitudinal direction including an output protrusion 47c received in an inclined hole 33c (refer to FIG. 4) in the blade 33.

The lever body 47a has a hole 47d between the input protrusion 47b and the output protrusion 47c in the longitudinal direction. The hole 47d is supported by the support pin 31g (refer to FIG. 4) in the base 31 in a swingable manner. This causes the drive lever 47 to swing about the support pin 31g as the magnet lever 45 swings about the swing shaft 31h (refer to FIG. 3).

As shown in FIG. 4, the partition 32 is an elongated plate formed by, for example, pressing a thin metal plate. The partition 32 extends across the entire area of the blade open-close device 30 in the longitudinal direction. The partition 32 has a first end (left in the figure) in its longitudinal direction fixed (attached) to the base 31 and a second end (right in the figure) in the longitudinal direction fixed (attached) to the cover 50. The partition 32 has a first opening 32a in the second end in the longitudinal direction. The first opening 32a extends through the partition 32 in the thickness direction. The first opening 32a has the center aligned with an optical axis P1 of the lens unit 21 as well as opposite to the small window 18 (refer to FIG. 1) in the frame 16 in the laptop personal computer 10.

This causes the lens unit 21 to face the small window 18 and to receive light through the small window 18. In other words, the first opening 32a in the partition 32 functions as an aperture that determines the amount of light entering the lens unit 21. Thus, the partition 32 may be referred to as an aperture blade. The partition 32 may be eliminated. In this case, a second opening 51h in the cover 50 functions as an aperture.

The partition 32 has, in the first end in the longitudinal direction, a pair of first holes 32b extending through the partition 32 in the thickness direction. One first hole 32b receives the positioning protrusion 31e, and the other first hole 32b receives a protrusion 42b on the coil bobbin 42 in the actuator unit 40. Thus, the partition 32 has the first end in the longitudinal direction precisely fixed to both the base 31 and the coil bobbin 42 without rattling. This allows the blade 33 driven by the actuator unit 40 to smoothly move relative to the partition 32.

The partition 32 has a first arc-shaped hole 32c having a substantially arc shape between the other first hole 32b and the first opening 32a in the longitudinal direction. The first arc-shaped hole 32c also extends through the partition 32 in the thickness direction. The first arc-shaped hole 32c receives the output protrusion 47c (refer to FIG. 5A) on the drive lever 47 in a movable manner. The output protrusion 47c has a distal end (the upper end in FIG. 4) reaching, through the partition 32, the blade 33 between the partition 32 and the cover 50. The output protrusion 47c is not in contact with the partition 32. This reduces the load applied to the actuator unit 40.

The partition 32 integrally includes a support projection 32d nearer the second end (right in FIG. 4) in the longitudinal direction than the first opening 32a. The support projection 32d is supported in a support hole 51f in the cover 50. The support projection 32d projects from the second end of the partition 32 in the longitudinal direction to have a width narrower than the width of the partition 32. This allows the support projection 32d to be inserted into the support hole 51f, which has a narrow width, in the cover 50 in the longitudinal direction of the partition 32. The support hole 51f in the cover 50 supports a back surface 32e of the support projection 32d (back surface 32e of the partition 32). The partition 32 has a front surface 32f supported by a partition-pressing protrusion 51g in the cover 50.

This defines a blade chamber RM (refer to FIG. 3) for accommodating the blade 33 in a movable manner between the partition 32 and the cover 50. More specifically, the partition 32 defines the blade chamber RM together with the cover 50. Thus, the blade 33 can smoothly move in the blade chamber RM. This also reduces the load applied to the actuator unit 40.

As shown in FIG. 4, the blade 33 is a thin plate formed from a resin material such as plastic. The blade 33 has a length in its longitudinal direction that is substantially half the length of the partition 32. As described above, the partition 32 formed from metal and the blade 33 formed from resin allow smooth movement of the blade 33 relative to the partition 32. This reduces the load applied to the actuator unit 40, thus reducing, for example, burning of the actuator unit 40.

The blade 33 has a first end (left in the figure) in the longitudinal direction having a long hole 33a. The long hole 33a extends straight in the longitudinal direction of the blade 33 (movement direction of the blade 33). The long hole 33a extends through the blade 33 in the thickness direction. The long hole 33a receives the protrusion 42b on the coil bobbin 42 in a movable manner in the assembled blade open-close device 30. The long hole 33a guides the blade 33 to reciprocate (opening and closing operation). The long hole 33a also regulates the distance of movement of the blade 33.

As described above, the blade 33 has the first end in the longitudinal direction guided by the protrusion 42b and a second end in the longitudinal direction guided by the pair of guide projections 31f. The blade 33 can thus move straight and precisely in the longitudinal direction of the blade open-close device 30.

The blade 33 includes a shutter portion 33b in the second end (right in the figure) in the longitudinal direction. The shutter portion 33b can cover the first opening 32a in the partition 32. The shutter portion 33b can entirely cover the first opening 32a as the blade 33 moves (refer to FIG. 7B). This prevents light from entering the lens unit 21.

As shown in FIG. 4, the blade 33 has the inclined hole 33c between the long hole 33a and the shutter portion 33b in the longitudinal direction. The inclined hole 33c is inclined in both the longitudinal direction and the lateral direction of the blade 33. The inclined hole 33c also extends through the blade 33 in the thickness direction. The inclined hole 33c receives the output protrusion 47c (refer to FIG. 5A) on the drive lever 47 in a slidable manner. This causes the output protrusion 47c to reciprocate while sliding along the inner side of the inclined hole 33c as the drive lever 47 swings. This causes the blade 33 to reciprocate in the longitudinal direction of the blade open-close device 30.

The blade 33 and the drive lever 47 have the partition 32 in between. The drive lever 47 and the blade 33 thus do not come in contact with each other. Thus, the swinging motion of the drive lever 47 does not adversely affect the linear motion of the blade 33. The blade 33 and the lens unit 21 have the partition 32 in between. The blade 33 thus does not come in contact with the lens unit 21. This effectively reduces, for example, damage to the lens unit 21.

As shown in FIG. 4, the cover 50 has a predetermined shape formed by, for example, pressing a metal plate. Similarly to the partition 32, the cover 50 extends across the entire area of the blade open-close device 30 in the longitudinal direction. The cover 50 has a first end (left in the figure) in its longitudinal direction attached (fixed) to the base 31 and a second end (right in the figure) in the longitudinal direction supported by the first surface 19a of the module board 19. The cover 50 includes an elongated plate-like cover body (body) 51 covering the blade 33. More specifically, the cover body 51 includes a first cover 51a covering a portion including the actuator unit 40 in the longitudinal direction of the blade open-close device 30 and a second cover 51b covering a portion including the camera module 20 in the longitudinal direction of the blade open-close device 30.

The first cover 51a is integral with three engagement portions 51c in total. The engagement portions 51c extend from the first cover 51a (cover body 51) toward the base 31. The engagement portions 51c are each hooked on the corresponding one of the three hook tabs 31d included in the base 31. Thus, the cover 50 is firmly fixed to the base 31.

In contrast, the second cover 51b has a second end in its longitudinal direction integral with a leg 51d. The leg 51d extends from a second end of the cover body 51 in the longitudinal direction toward the first surface 19a of the module board 19. The leg 51d has a distal end in contact with and supported by the first surface 19a of the module board 19. The leg 51d is integral with a pair of reinforcements 51e (refer to FIGS. 7A and 7B) bent in the longitudinal direction of the cover body 51. The reinforcements 51e also have distal ends in contact with the first surface 19a of the module board 19. The leg 51d including the pair of reinforcements 51e has a substantially U-shaped cross section in a direction intersecting with the optical axis P1. This increases the rigidity of the leg 51d, thus preventing the leg 51d from tilting outward (opposite to the camera module 20). More specifically, the second cover 51b is sufficiently rigid in the direction of the optical axis P1.

The substantially square support hole 51f is located near a basal end of the leg 51d. The support hole 51f extends through the cover 50 in the thickness direction and receives the support projection 32d of the partition 32. More specifically, the support hole 51f receives the support projection 32d inserted from its portion nearer the first end of the cover 50 in the longitudinal direction (refer to FIGS. 7A and 7B). Thus, the partition 32 has the back surface 32e (refer to FIG. 3) supported by the support hole 51f, thus reducing the likelihood that the partition 32 moves or bends toward the camera module 20 (lens unit 21).

The second cover 51b has the second end in the longitudinal direction integral with the partition-pressing protrusion 51g near the leg 51d. The partition-pressing protrusion 51g protrudes with a predetermined height toward the front surface 32f of the partition 32. With the support projection 32d received in the support hole 51f, the partition-pressing protrusion 51g is pressed onto the front surface 32f of the partition 32. Thus, the partition 32 has the second end in the longitudinal direction fixed to the second end of the cover 50 in the longitudinal direction without rattling. This also precisely defines the blade chamber RM (refer to FIG. 3) between the partition 32 and the cover 50. The blade chamber RM has a thickness in the direction of the optical axis P1 defined by the height of the partition-pressing protrusion 51g.

The support projection 32d received in the support hole 51f is firmly fixed to the cover 50 with an adhesive (not shown) and is prevented from slipping off. A predetermined amount of adhesive is poured into the support hole 51f. Any large amount of adhesive poured into the support hole 51f is stopped by the partition-pressing protrusion 51g. This prevents the adhesive from flowing into the blade chamber RM. This effectively reduces, for example, defective products.

As shown in FIG. 4, the second cover 51b (second end of the cover body 51 in the longitudinal direction) has the second opening 51h. The second opening 51h extends through the second cover 51b in the thickness direction. The second opening 51h has the center aligned with the optical axis P1 of the lens unit 21 as well as opposite to the small window 18 (refer to FIG. 1) in the frame 16 in the laptop personal computer 10.

The second opening 51h in the cover 50 has the same shape and the same opening area as the first opening 32a in the partition 32. The first opening 32a and the second opening 51h overlap with each other in the direction of the optical axis P1. The shutter portion 33b in the blade 33 is movable between the first opening 32a and the second opening 51h.

The first cover 51a (first end of the cover 50 in the longitudinal direction) has a pair of second holes 51k extending through the cover body 51 in the thickness direction. One second hole 51k receives the positioning protrusion 31e on the base 31, and the other second hole 51k receives the protrusion 42b on the coil bobbin 42. This causes the first end of the cover 50 in the longitudinal direction to precisely support both the base 31 and the coil bobbin 42 without rattling. This allows the blade 33 driven by the actuator unit 40 to smoothly move in the blade chamber RM.

The first cover 51a has a second arc-shaped hole 51m having a substantially arc shape near the second cover 51b and between the other second hole 51k and the second opening 51h. The second arc-shaped hole 51m also extends through the cover body 51 in the thickness direction. The second arc-shaped hole 51m receives the output protrusion 47c (refer to FIG. 5A) on the drive lever 47 in a movable manner. The second arc-shaped hole 51m has the same shape as the first arc-shaped hole 32c in the partition 32. Thus, the output protrusion 47c is also not in contact with the cover 50. This reduces the load applied to the actuator unit 40.

The cover 50 is fixed to the base 31 with the hook tabs 31d and the engagement portions 51c. The fixing structure is not limited to this example. For example, the cover 50 may be fixed to the base 31 with, for example, fixing screws.

As described above, the cover 50 includes, in the second end in the longitudinal direction, the leg 51d supported by the first surface 19a of the module board 19. Thus, the second end of the cover 50 in the longitudinal direction may not be supported by the base 31. More specifically, the base 31 may not extend across the entire area of the cover 50 in the longitudinal direction, thus shortening the length of the base 31. With the base 31 having a shorter length, the camera module 20 (refer to FIG. 3) including a high-resolution image sensor, which is large, may be used without upsizing the camera unit 17.

The operation of the blade open-close device 30 included in the camera unit 17 with the above structure will now be described in detail with reference to FIGS. 6A, 6B, 7A, and 7B.

Open to Closed

When the blade open-close device 30 is open as shown in FIG. 7A and the coil 43 is not energized, the actuator unit 40 is in the state shown in FIG. 6A. More specifically, the magnet projection 46a is under a magnetic force and is attracted to the first arm 41a of the yoke 41, or in other words, the magnet projection 46a is near the first arm 41a. Thus, the blade 33 remains open as shown in FIG. 7A.

When the driving current is supplied to the coil 43 in the forward direction, the first arm 41a is magnetized to the N pole, and the second arm 41b is magnetized to the S pole as shown in FIG. 6A. Thus, the magnet projection 46a magnetized to the N pole is repelled by the first arm 41a and attracted to the second arm 41b. The magnet lever 45 swings clockwise as indicated by an arrow R1 in the figure, and the drive lever 47 swings counterclockwise accordingly as indicated by an arrow R2 in the figure.

This moves the output protrusion 47c on the drive lever 47 to the position indicated by a dashed line in FIG. 6A (into the state in FIG. 6B). Thus, the output protrusion 47c at a position near the shutter portion 33b in the inclined hole 33c in the longitudinal direction as shown in FIG. 7A moves to a position near the long hole 33a in the inclined hole 33c in the longitudinal direction as shown in FIG. 7B. Thus, the blade 33 moves to the second end of the cover 50 in the longitudinal direction (near the leg 51d), and the shutter portion 33b covers the first opening 32a in the partition 32, thus covering the lens 21b as shown in FIG. 7B.

Light passing through the second opening 51h in the cover 50 is blocked by the shutter portion 33b in the blade 33 and does not reach the lens 21b. When the camera module 20 in this state is operated as unintended by the user, images or videos are not captured. This reliably prevents, for example, images or videos unintended by the user from being obtained and released onto the Internet.

Closed to Open

When the blade open-close device 30 is closed as shown in FIG. 7B and the coil 43 is not energized, the actuator unit 40 is in the state shown in FIG. 6B. More specifically, the magnet projection 46a is under a magnetic force and is attracted to the second arm 41b of the yoke 41, or in other words, the magnet projection 46a is near the second arm 41b. Thus, the blade 33 remains closed as shown in FIG. 7B.

When the driving current is supplied to the coil 43 in the reverse direction, the second arm 41b is magnetized to the N pole, and the first arm 41a is magnetized to the S pole as shown in FIG. 6B. Thus, the magnet projection 46a magnetized to the N pole is repelled by the second arm 41b and attracted to the first arm 41a. Thus, the magnet lever 45 swings counterclockwise as indicated by an arrow R3 in the figure, and the drive lever 47 swings clockwise accordingly as indicated by an arrow R4 in the figure.

This moves the output protrusion 47c on the drive lever 47 to the position indicated by a dashed line in FIG. 6B (into the state in FIG. 6A). Thus, the output protrusion 47c at the position near the long hole 33a in the inclined hole 33c in the longitudinal direction as shown in FIG. 7B moves to the position near the shutter portion 33b in the inclined hole 33c in the longitudinal direction as shown in FIG. 7A. Thus, the blade 33 moves to the first end of the cover 50 in the longitudinal direction (near the flexible substrate 44), and the shutter portion 33b uncovers the first opening 32a in the partition 32, thus uncovering the lens 21b as shown in FIG. 7A.

Light passing through the second opening 51h in the cover 50 reaches the lens 21b through the first opening 32a in the partition 32. Thus, the camera module 20 in this state can be operated as intended by the user to capture images or videos.

In the present embodiment as described in detail above, the camera module 20 is covered by the blade 33, allowing the user to notice that no image capturing is being performed and thus increasing the user comfort. The base 31 is attached to the first surface 19a of the module board 19, and the cover 50 has the first end in the longitudinal direction attached to the base 31 and the second end in the longitudinal direction supported by the first surface 19a of the module board 19. The base 31 may not extend to the second end of the cover 50 in the longitudinal direction and can have a shorter length (miniaturized), further miniaturizing the blade open-close device 30. Thus, the frame 16 included in the laptop personal computer 10 may be thinner, improving the functionality and the design of the laptop personal computer 10.

In the present embodiment, the cover 50 includes the cover body 51 covering the blade 33 and the leg 51d extending from the cover body 51 toward the first surface 19a of the module board 19 and supported by the first surface 19a. The leg 51d includes the pair of reinforcements 51e bent in the longitudinal direction of the cover body 51. This increases the rigidity of the leg 51d, thus preventing the leg 51d from tilting outward (opposite to the camera module 20). More specifically, the second cover 51b has sufficiently high rigidity in the direction of the optical axis P1.

A second embodiment of the present invention will now be described in detail with reference to the drawings. Like reference numerals denote like functional elements in the above first embodiment. Such elements will not be described.

Figure 8:
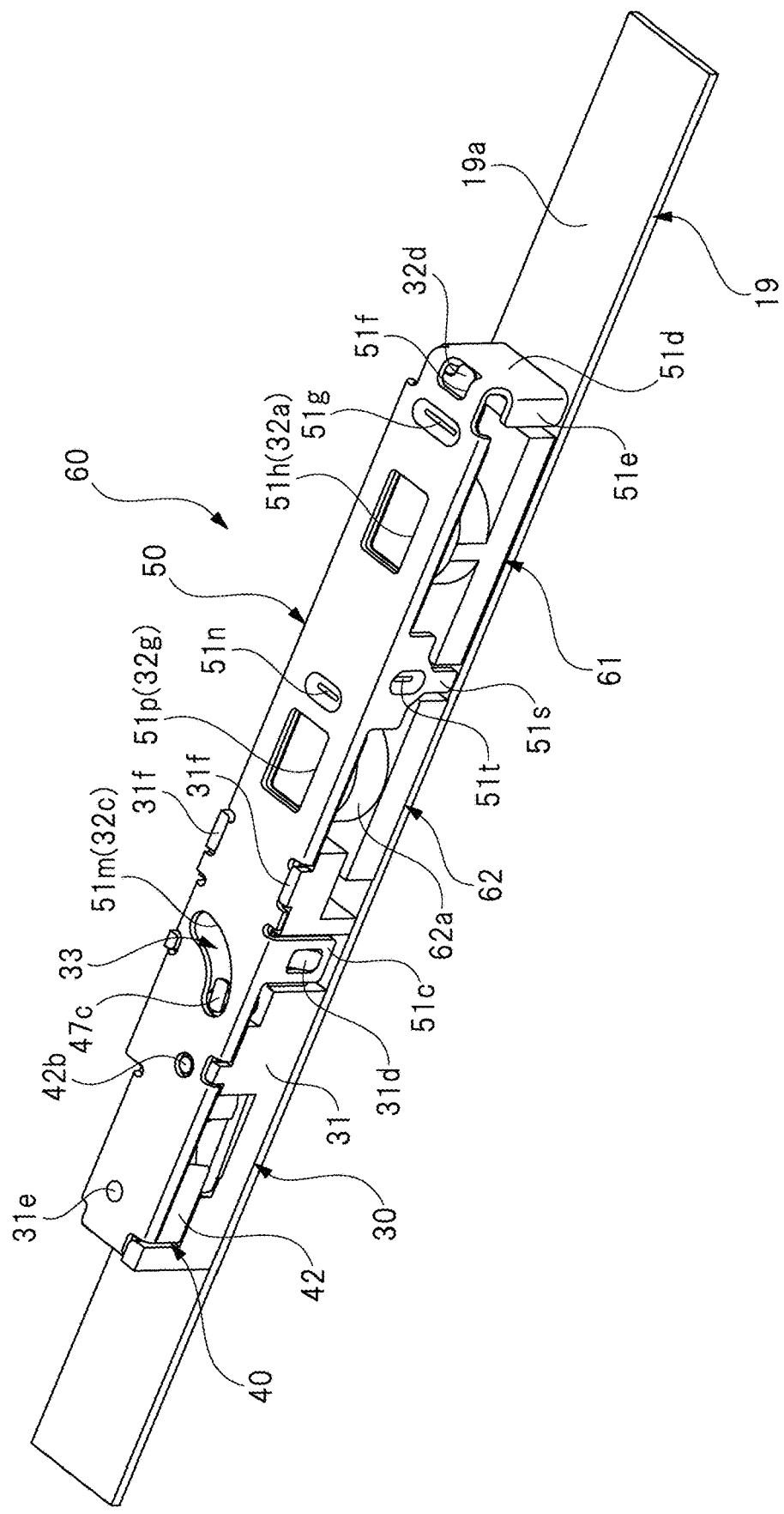
FIG. 8 is a perspective view of a camera unit in a second embodiment.
Figure 9:
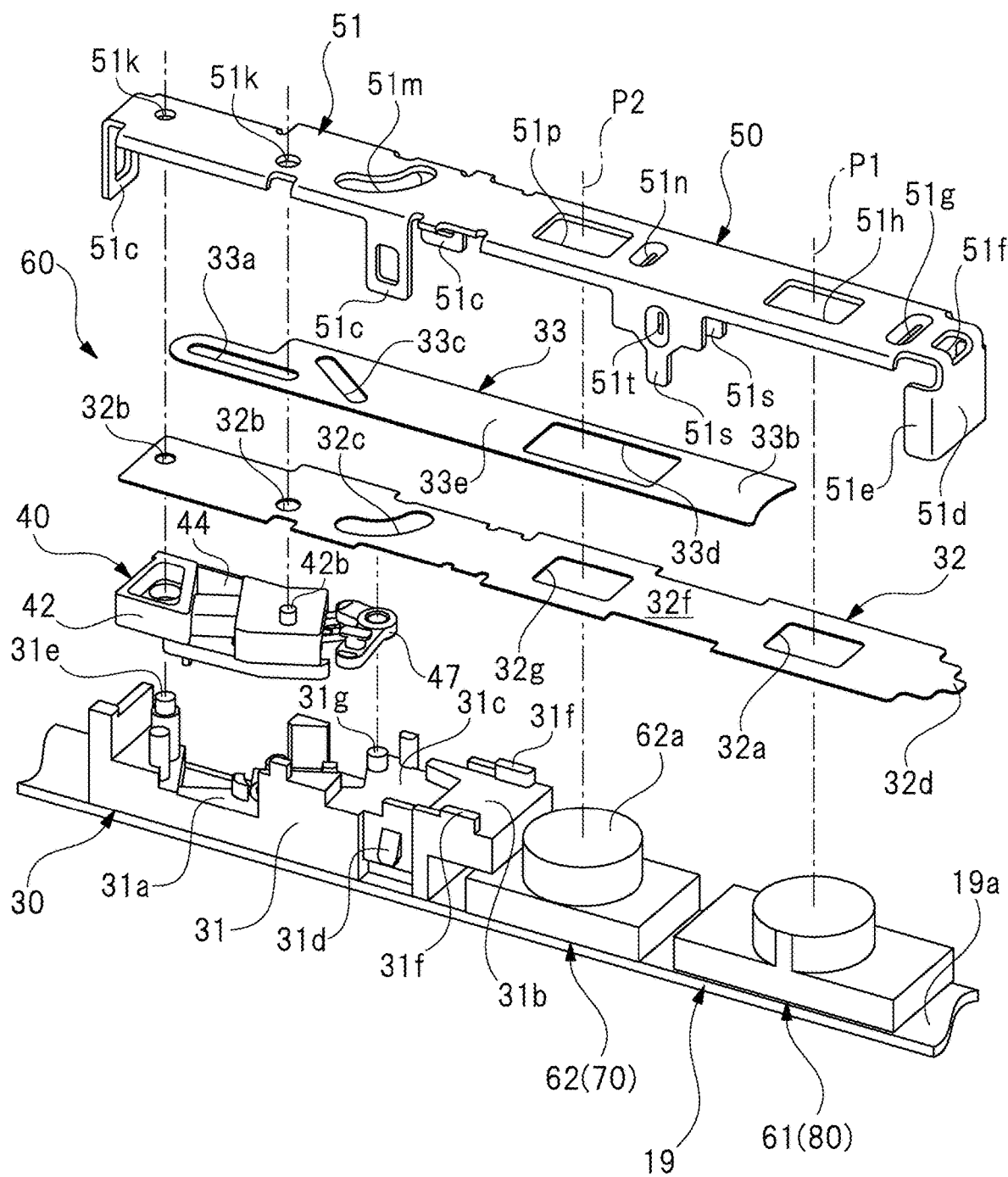
FIG. 9 is an exploded perspective view of the camera unit in FIG. 8.

FIG. 8 is a perspective view of a camera unit in the second embodiment. FIG. 9 is an exploded perspective view of the camera unit in FIG. 8.

As shown in FIGS. 8 and 9, a camera unit 60 in the second embodiment includes a first camera module 61 and a second camera module 62 arranged in the longitudinal direction of a module board 19. The first camera module 61 and the second camera module 62 both correspond to a detection device in an aspect of the present invention. A blade open-close device 30 has a length in the longitudinal direction of the module board 19 greater than the length of the camera unit 17 (refer to FIGS. 2 to 4) in the first embodiment. More specifically, a partition 32, a blade 33, and a cover 50 have greater lengths than the corresponding components in the first embodiment. A base 31 and an actuator unit 40 held by the base 31 are the same as in the first embodiment.

As shown in FIG. 9, the partition 32 has a third opening 32g between a first opening 32a and a first arc-shaped hole 32c in its longitudinal direction. Similarly to the first opening 32a, the third opening 32g also extends through the partition 32 in the thickness direction. The third opening 32g has the center aligned with an optical axis P2 of a lens unit 62a in the second camera module 62. Another small window (not shown) in a frame 16 in a laptop personal computer 10 has the center aligned with the optical axis P2.

As shown in FIG. 9, the blade 33 has a blade opening 33d and another shutter portion 33e arranged between a shutter portion 33b and an inclined hole 33c in its longitudinal direction. The blade opening 33d is located near the shutter portion 33b. The other shutter portion 33e is located near the inclined hole 33c. When the blade open-close device 30 is open, the blade opening 33d is aligned with the optical axis P2, thus uncovering the lens unit 62a. When the blade open-close device 30 is closed, the other shutter portion 33e is aligned with the optical axis P2, thus covering the lens unit 62a. The first camera module 61 and the second camera module 62 are synchronously covered and uncovered by the blade 33 as the blade 33 reciprocates.

As shown in FIG. 9, the cover 50 has another partition-pressing protrusion 51n and a fourth opening 51p arranged between a second opening 51h and a second arc-shaped hole 51m in its longitudinal direction. The other partition-pressing protrusion 51n is located near the second opening 51h, and the fourth opening 51p is located near the second arc-shaped hole 51m. The other partition-pressing protrusion 51n protrudes through the blade opening 33d in the blade 33 and is pressed onto a front surface 32f between the first opening 32a and the third opening 32g in the partition 32. This also precisely defines a blade chamber RM (refer to FIG. 3) in this portion (around the fourth opening 51p) between the partition 32 and the cover 50. The other partition-pressing protrusion 51n protrudes with the same height as the height of a partition-pressing protrusion 51g. The fourth opening 51p has the center aligned with the optical axis P2.

As shown in FIG. 9, the cover 50 includes, in the longitudinal direction, a pair of reinforcing pillars 51s between a pair of engagement portions 51c, which face each other in the width direction of the cover 50, and a leg 51d. Similarly to the pair of engagement portions 51c, the reinforcing pillars 51s face each other in the width direction of the cover 50. Similarly to the engagement portions 51c and the leg 51d, the reinforcing pillars 51s extend toward the first surface 19a of the module board 19. The pair of reinforcing pillars 51s have distal ends in contact with and supported by the first surface 19a as shown in FIG. 8. The reinforcing pillars 51s each integrally include a recessed portion 51t (one is shown in the figure) recessed toward another reinforcing pillar 51s, and thus have sufficient strength. This effectively reduces the likelihood that the cover 50 is bent under any pressing force on the cover 50 in the directions of the optical axes P1 and P2 to cause an operation failure of the blade 33.

In the second embodiment, as described above, the laptop personal computer 10 (refer to FIG. 1) includes the first camera module 61 and the second camera module 62 (both corresponding to the detection device in an aspect of the present invention) and the blade open-close device 30 that covers and uncovers the first camera module 61 and the second camera module 62. Instead of this, the embodiment may be modified as in a first modification and a second modification described below.

First Modification

In the first modification of the second embodiment, the first camera module 61 and a light-emitting diode (LED) lamp 70 (refer to the corresponding reference numeral in parentheses in FIG. 9) are arranged side by side. In this case, the laptop personal computer 10 includes the frame 16 (refer to FIG. 1) having a pair of the small windows 18 (one is shown in the figure). One small window 18 faces the first camera module 61, and the other small window 18 faces the LED lamp 70. The laptop personal computer 10 in the first modification can brightly illuminate the user when used in dark surroundings. This allows the user to have, for example, an online meeting with a clear image. The LED lamp 70 corresponds to a light-emitting device in an aspect of the present invention.

Second Modification

In the second modification of the second embodiment, instead of the first camera module 61 and the second camera module 62, the LED lamp 70 and the other LED lamp 80 (refer to the corresponding reference numeral in parentheses in FIG. 9) are arranged side by side. In this case, similarly to the above first modification, the laptop personal computer 10 includes the frame 16 having a pair of the small windows 18. One small window 18 faces the LED lamp 70, and the other small window 18 faces the LED lamp 80. In the second modification, the user can easily determine the operational state of the laptop personal computer 10, such as whether the laptop personal computer 10 is communicating with the network and whether the remaining battery level of the built-in battery is sufficiently high. The LED lamp 80 also corresponds to the light-emitting device in an aspect of the present invention.

The LED lamps 70 and 80 have shapes similar to the shapes of the camera modules (refer to FIG. 9). The LED lamps 70 and 80 are covered by the blade open-close device 30, allowing the user to notice that no image capturing is being performed and thus increasing the user comfort.

The second embodiment, including the first modification and the second modification with the above structures, also produces the same advantageous effects as in the above first embodiment. In addition, the structure in the second embodiment allows use of a pair of camera modules (detection devices), a pair of LED lamps (light-emitting devices), or a combination of a camera module and an LED lamp (a detection device and a light-emitting device), thus being easily available for various electronic devices including the laptop personal computer 10.

A third embodiment of the present invention will now be described in detail with reference to the drawings. Like reference numerals denote like functional elements in the above first embodiment. Such elements will not be described.

Figure 10:
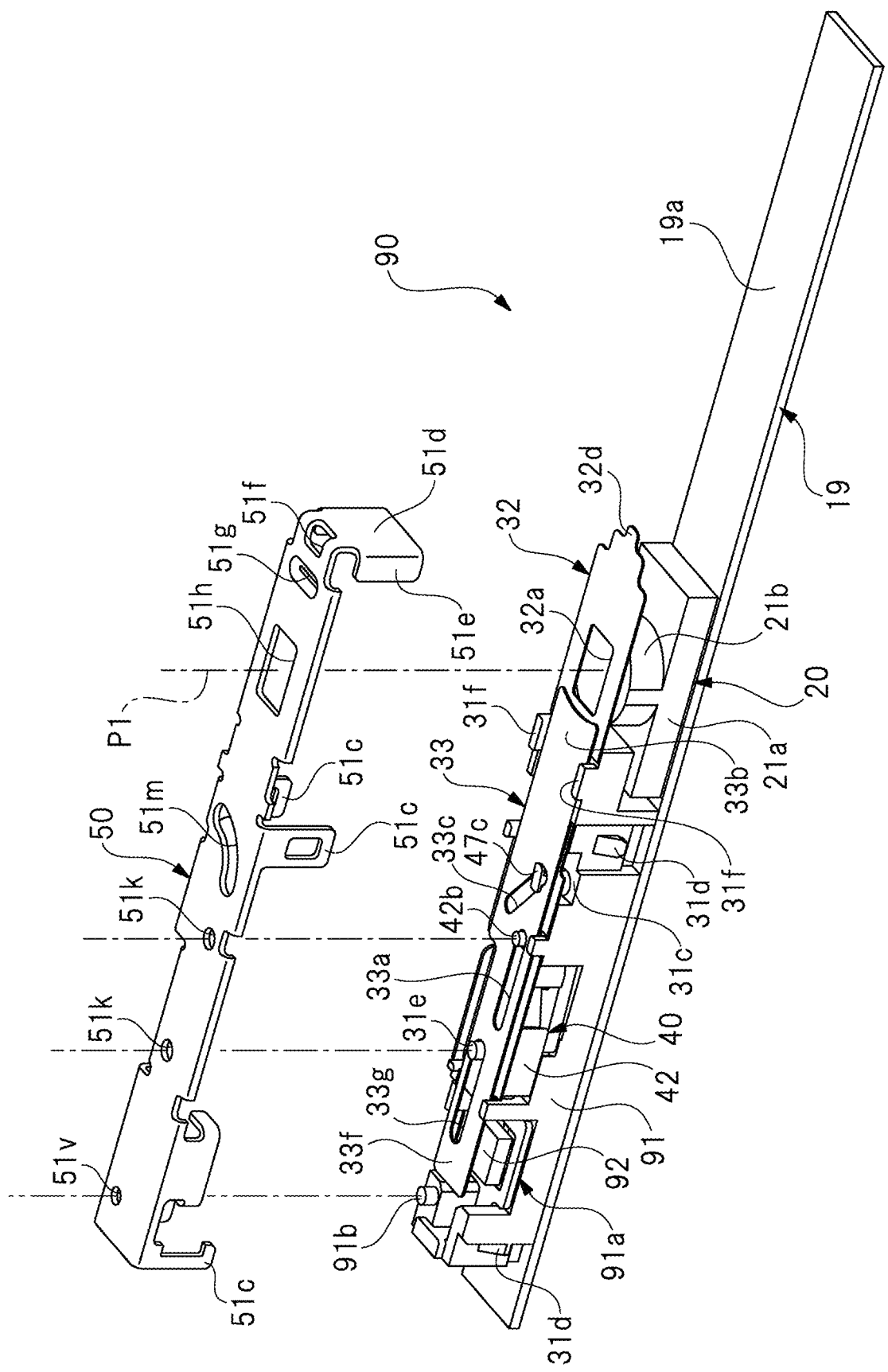
FIG. 10 is an exploded perspective view of a camera unit in a third embodiment.
Figure 11A:
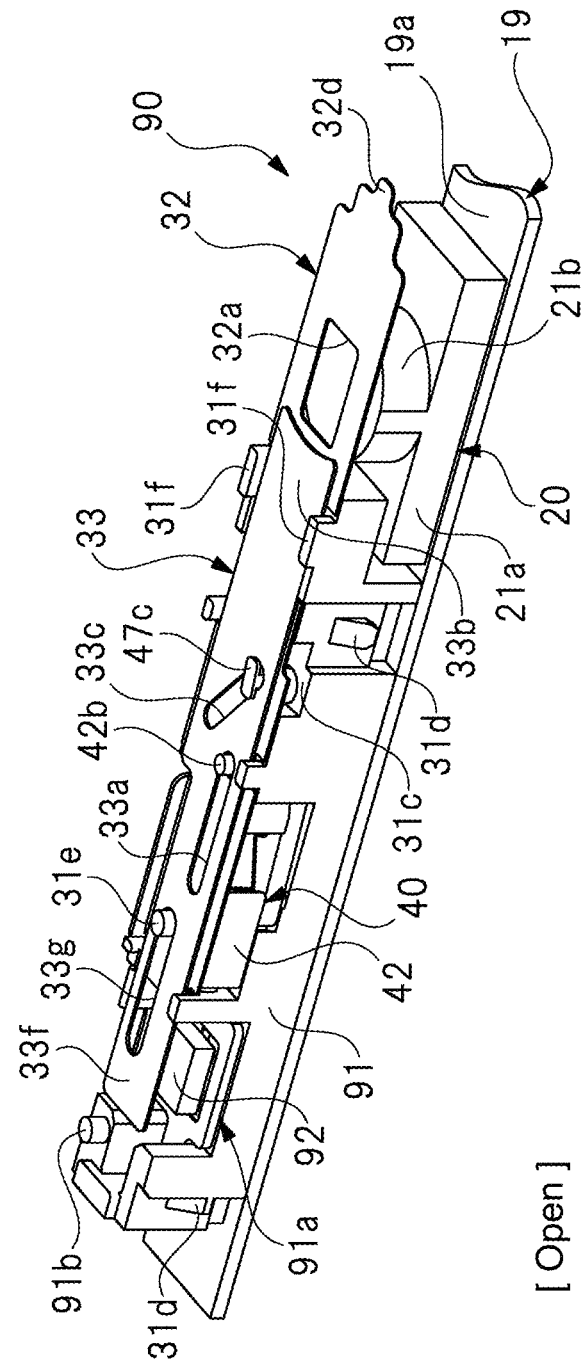
FIG. 11A is a diagram describing the operation of a photoreflector (open).
Figure 11B:
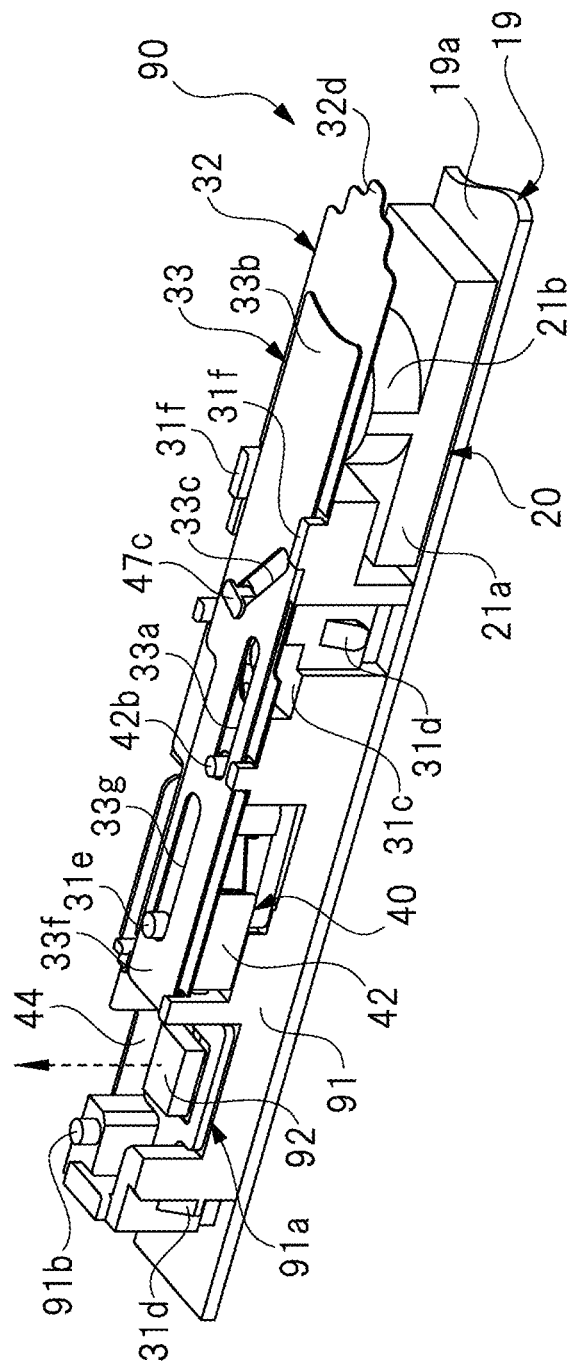
FIG. 11B is a diagram describing the operation of the photoreflector (closed).

FIG. 10 is an exploded perspective view of a camera unit in the third embodiment. FIG. 11A is a diagram describing the operation of a photoreflector (open). FIG. 11B is a diagram describing the operation of the photoreflector (closed).

As shown in FIGS. 10, 11A, and 11B, a camera unit 90 in the third embodiment differs from the camera unit in the first embodiment in the shape of a base 91. More specifically, the base 91 has a first end (left in the figure) in its longitudinal direction having a photoreflector-receiving recess 91a. The base 91 thus has a length in the longitudinal direction of a module board 19 greater than the length of the base 31 (refer to FIG. 2) in the first embodiment. More specifically, the photoreflector-receiving recess 91a is located opposite to a lever-receiving recess 31c from an actuator-receiving recess 31a.

The photoreflector-receiving recess 91a receives a photoreflector 92. As indicated by a dashed arrow in FIG. 11B, the photoreflector 92 emits infrared light toward a cover 50 (refer to FIG. 10) and receives reflected infrared light from the emitted light to detect an obstacle in the emission direction (up in the figure) of the photoreflector 92. The photoreflector 92 receives a driving current from the module board 19 through a flexible substrate 44.

As shown in FIGS. 10, 11A, and 11B, a blade 33 has a first end (left in the figures) in its longitudinal direction integrally including a sensor cover 33f. The sensor cover 33f can cover the photoreflector 92 as the blade 33 reciprocates. As shown in FIG. 11A, the sensor cover 33f covers the photoreflector 92 when a blade open-close device 30 is open. As shown in FIG. 11B, the sensor cover 33f uncovers the photoreflector 92 when the blade open-close device 30 is closed. The cover 50 includes a portion facing the photoreflector 92 that is colored black (not shown) and thus mostly absorbs infrared light emitted from the photoreflector 92. Thus, when the blade open-close device 30 is closed (refer to FIG. 11B), the photoreflector 92 receives a smaller amount of light.

The sensor cover 33f includes a portion facing the photoreflector 92 that has the same red color (not shown) as infrared light, and thus mostly reflects infrared light emitted from the photoreflector 92. Thus, when the blade open-close device 30 is open (refer to FIG. 11A), the photoreflector 92 receives a larger amount of light. In this manner, the difference in the amount of light between the open state and the closed state is detected to detect the open state or the closed state of the blade open-close device 30.

As shown in FIGS. 10, 11A, and 11B, the blade 33 with a greater length is to be designed to smoothly reciprocate without swinging. In the present embodiment, the blade 33 has another long hole 33g similar to a long hole 33a between the sensor cover 33f and the long hole 33a in the longitudinal direction. The other long hole 33g receives a positioning protrusion 31e in a slidable manner. This allows the first end of the blade 33 in the longitudinal direction to be guided by the positioning protrusion 31e, thus allowing the entire blade 33 to reciprocate smoothly without swinging.

The base 91, which has the longer first end in the longitudinal direction, has an insert protrusion 91b near the photoreflector-receiving recess 91a. The insert protrusion 91b is inserted into and fixed in a third hole 51v (refer to FIG. 10) in the cover 50. This precisely aligns the entire area of the cover 50 in its longitudinal direction along the longitudinal direction of the module board 19. The structure in the third embodiment described above includes the photoreflector-receiving recess 91a and the photoreflector 92 received in the photoreflector-receiving recess 91a, and thus both the blade 33 and the cover 50 have greater lengths.

The third embodiment with the above structure also produces the same advantageous effects as in the above first embodiment. In addition, the structure in the third embodiment includes the photoreflector 92 that can detect the open or closed state of the blade 33. This can provide, to the laptop personal computer 10, feedback on whether the blade 33 is open or closed, thus allowing proper management of the operational state of the blade open-close device 30.

The present invention is not limited to the above embodiments, but may be modified variously without departing from the spirit and scope of the invention. For example, although the electronic device is the laptop personal computer 10 in the above embodiments, the present invention is not limited to the embodiments but is also applicable to, for example, a smartphone and a tablet terminal.

The camera module 20, the first camera module 61, and the second camera module 62 as a detection device may be any cameras such as an infrared camera and an image capturing camera controlled through a universal serial bus (USB) connection. The detection device may be, for example, a light-receiving sensor used for automatically adjusting the illuminance of backlight for the display of an electronic device and a temperature sensor mounted on an electronic device placed in a storefront for measuring the temperatures of customers. In other words, the detection device may be any device that can capture information external to the electronic device into the electronic device. In the first embodiment described above, a light-emitting device including a light emitter for illuminating the keyboard 13 (refer to FIG. 1) such as an LED lamp may be used, instead of the camera module 20 as a detection device. This causes the light emitter having a shape similar to the shape of the camera module such as an LED lamp to be covered by the blade open-close device 30, allowing the user to notice that no image capturing is being performed and thus increasing the user comfort.

To allow the blade 33 being closed to be clear externally, the shutter portion 33*b* (33*e*) may have a front surface with the word "closed" or a front surface colored with a highly visible color such as red. This allows the user to readily externally notice the protection from unintended image or video capturing.

The materials, shapes, dimensions, numbers, and positions of the components in the above embodiments may be determined as appropriate to achieve the aspects of the present invention without being limited to the above embodiments.

What is claimed is:

1. An electronic device, comprising:
   a frame being hollow;
   at least one of a detection device or a light-emitting device accommodated in the frame and facing an opening in the frame; and
   an open-close device accommodated in the frame, the open-close device being configured to cover and uncover the opening,
   wherein the open-close device includes:
      a blade configured to cover and uncover the opening,
      an actuator configured to reciprocate the blade using a drive lever,
      a base holding the actuator and attached to an attachment surface of the frame, wherein the base comprises:
         an actuator-receiving recess configured to receive the actuator, wherein a distance from a bottom surface of the base to a top surface of the actuator-receiving recess is a first distance,
         a partition support proximate the detection device or the light-emitting device, wherein a distance from the bottom surface of the base to a top surface of the partition support is a second distance, and
         a lever-receiving recess configured to receive the drive lever, wherein a distance from the bottom surface of the base to a top surface of the lever-receiving recess is a third distance, the third distance is greater than the first distance, and the second distance is greater than the third distance, and
      a cover covering the blade and having a first end in a longitudinal direction attached to the base and a second end in the longitudinal direction supported by the attachment surface.

2. The electronic device according to claim 1, wherein the cover includes
   a body covering the blade, and
   a leg extending from the body toward the attachment surface and supported by the attachment surface.

3. The electronic device according to claim 2, wherein the leg includes a reinforcement bent in a longitudinal direction of the body.

4. The electronic device according to claim 1, further comprising:
   a partition defining, together with the cover, a blade chamber accommodating the blade,
   the partition having a first end in a longitudinal direction fixed to the base and a second end in the longitudinal direction fixed to the cover.

5. The electronic device according to claim 1, wherein the frame has a pair of the openings, and
   the pair of openings each face a corresponding detection device of a pair of the detection devices.

6. The electronic device according to claim 1, wherein the frame has a pair of the openings,
   the detection device faces one of the pair of openings, and
   the light-emitting device faces the other of the pair of openings.

7. The electronic device according to claim 1, wherein the frame has a pair of the openings, and
   the pair of openings each face a corresponding opening of a pair of the light-emitting devices.

* * * * *